(12) United States Patent
Albisetti

(10) Patent No.: US 7,025,922 B2
(45) Date of Patent: Apr. 11, 2006

(54) METHOD OF MANUFACTURING A BELLOWS

(75) Inventor: Nicolas Albisetti, Paris (FR)

(73) Assignee: L'Oreal, Paris (FR)

(*) Notice: Subject to any disclaimer, the term of this patent is extended or adjusted under 35 U.S.C. 154(b) by 634 days.

(21) Appl. No.: 09/906,416

(22) Filed: Jul. 16, 2001

(65) Prior Publication Data

US 2002/0020941 A1 Feb. 21, 2002

(30) Foreign Application Priority Data

Jul. 20, 2000 (FR) .............................. 00 09534

(51) Int. Cl.
B29C 45/00 (2006.01)

(52) U.S. Cl. ...................................... 264/296
(58) Field of Classification Search ................. 264/294, 264/296
See application file for complete search history.

(56) References Cited

U.S. PATENT DOCUMENTS

| | | | | |
|---|---|---|---|---|
| 3,819,789 A | * | 6/1974 | Parker | 264/534 |
| 4,592,492 A | * | 6/1986 | Tidmore | 222/209 |
| 5,088,580 A | * | 2/1992 | Grothe et al. | 188/298 |
| 5,490,966 A | | 2/1996 | Peterson et al. | 264/318 |
| 5,851,476 A | | 12/1998 | Wydra et al. | 264/507 |
| 6,042,360 A | * | 3/2000 | Padovani | 425/403.1 |

FOREIGN PATENT DOCUMENTS

| | | |
|---|---|---|
| DE | 39 30 388 | 3/1991 |
| EP | 0 304 567 | 3/1989 |
| EP | 0 972 624 | 1/2000 |
| JP | 61 228942 | 10/1986 |
| JP | 63 237933 | 10/1988 |
| JP | 3 268919 | 11/1991 |

OTHER PUBLICATIONS

French Search Report dated Apr. 5, 2001 and referenced which are copied herein.

* cited by examiner

*Primary Examiner*—Gene Mancene
*Assistant Examiner*—Patrick M Buechner
(74) *Attorney, Agent, or Firm*—Hunton & Williams LLP

(57) ABSTRACT

A method of manufacturing a plastics material bellows, wherein a preform is made by molding plastics material in a mold, the mold having preferred deformation zones, and then before the part has completely left the mold, the bellows is formed by folding the preform in the preferred deformation zones, with the resulting bellows being open at both ends.

23 Claims, 7 Drawing Sheets

METHOD OF MANUFACTURING A BELLOWS

The present invention relates to a method of manufacturing at least one bellows.

BACKGROUND OF THE INVENTION

U.S. Pat. No. 5,851,476 discloses a method of manufacturing a sealing bellows for a hinge mechanism in which a rigid preform is made by injection molding in a first workstation, the preform then being transported to a second workstation where it is heated and subjected to deformation so as to form the bellows.

That method is relatively complex to implement because of the preform being transferred from one station to another, and it also suffers from the drawback of being expensive in energy terms because the preform must be heated in the second workstation before being deformed therein.

U.S. Pat. No. 5,490,966 discloses a method of making a bellows by injection molding in a mold. The bellows is extracted from the mold by means of a pneumatic device that is relatively complicated.

Japanese patent application No. JP 3-268919 describes a bellows made by injection molding in a mold. The bellows is molded in its final configuration and presents folds of reduced thickness.

OBJECTS AND SUMMARY OF THE INVENTION

The present invention provides a novel method making it easy to manufacture at least one bellows.

In this method a preform is made by molding thermoplastic material in a mold, the preform having preferred deformation zones, after which, prior to the part completely leaving the mold, the bellows is formed by folding the preform in its preferred deformation zone, the bellows obtained in this way being open at both ends.

By means of the invention, and unlike the method described in U.S. Pat. No. 5,851,476, the bellows can be made completely in a single workstation, thereby obtaining a saving in time.

Furthermore, the fact that the bellows is made before the part has completely left the mold makes it possible to take advantage of the heat delivered during molding the preform and avoids the need to heat the preform again in order to deform it, which is advantageous in energy terms.

The bellows is thus preferably made from the preform prior to the preform cooling down completely.

By means of the invention, the bellows can also be extracted more easily because the preform can be made without any pronounced undercut.

In particular, unmolding can take place along the axis of the bellows without any need to cause it to be extended using a pneumatic device of the kind described in above-mentioned U.S. Pat. No. 5,490,966.

The preferred deformation zones are advantageously made in the form of areas of reduced thickness, taking advantage of the ability of injection molding to provide control over thickness.

The bellows is preferably made from the preform by moving a first region of the preform axially relative to a second region thereof, the preform having at least one preferred deformation zone between said regions.

All of the preferred deformation zones are preferably situated between said regions.

In a particular implementation of the invention, the mold has at least one moving portion for causing the first region to move relative to the second.

Still in a particular implementation of the invention, the first region of the preform is made with a coupling portion suitable for remaining engaged with a portion of the mold while the bellows is being formed.

The above-mentioned moving portion can be constituted by a pin used while molding the preform, and the coupling portion can include an undercut.

In a variant, the moving portion in question can be constituted by a moving pin, itself including a core capable of being moved relative to the remainder of the pin.

The core preferably co-operates with the remainder of the pin to define a cavity used for molding the above-mentioned coupling portion.

In a particular implementation of the invention, once the preform has been molded with the coupling portion, the core and the remainder of the pin are moved together initially, in order to form the bellows, and then the core is moved relative to the remainder of the pin in order to separate the bellows from the pin.

Advantageously, the core separates from the coupling portion by the coupling portion deforming elastically.

In another particular implementation of the invention, the above-specified moving portion is situated outside the preform and comes to bear thereagainst.

The moving portion can then be used to eject the bellows from the mold.

The preform is preferably molded in contact with a pin, and the pin is left inside the preform at least at the beginning of bellows formation.

That makes it possible, where necessary, to constrain one or more folds of the bellows to form in an outward direction.

Also preferably, at least three preferred deformation zones are formed, including an intermediate preferred deformation zone implemented by means of a recess opening out to the inside surface of the preform, and two other preferred deformation zones on either side thereof.

This way of making the preferred deformation zones contributes to the fold(s) of the bellows being formed towards the outside of the preform.

The preform can be made by injection molding using a non-elastomer plastics material.

The preform can be molded in a thermoplastic material selected from the following (non-limiting) list: polyolefins, in particular polyethylene or polypropylene.

Advantageously, the preform is molded with a dispenser endpiece and/or a portion of a receptacle and/or an assembly skirt.

The invention also provides a preform for implementing the method as defined above, the preform comprising a wall having at least one constriction enabling at least one bellows to be created.

The invention also provides a mold for manufacturing a preform for making at least one bellows and for forming the bellows from said preform, the mold comprising mold portions arranged to mold the preform with preferred deformation zones between a first region and a second region thereof, and with an opening at each end of the preform, and drive means enabling the first region, once it has been molded, to be moved axially relative to the second region.

Advantageously, the mold includes a pin that is used for molding the preform and that is capable of being moved while bringing the first and second regions towards each other after the preform has been molded.

In a particular embodiment, the pin is suitable for co-operating with a coupling portion of the preform so as to drive a region of the preform while it moves.

The pin preferably includes a hollow portion and a moving core, together defining a cavity for molding the coupling portion.

In another particular embodiment, the pin has an undercut enabling the first region of the preform to be driven in displacement relative to the second region in order to form the bellows.

The mold can have a slider for making a dispenser endpiece integrally with the preform.

The invention also provides a bellows made by injection molding a thermoplastic material into a mold, the bellows having areas of reduced thickness giving rise to preferred deformation zones, being optionally open at both ends, and presenting traces of being deformed while hot.

In a particular embodiment, the bellows has a transverse wall at one end with a central orifice passing through it and extended inside the bellows by one or more coupling elements.

The invention makes it possible to provide bellows of small dimensions, having a minimum inside diameter less than or equal to 50 millimeters (mm), or even less than or equal to 30 mm, or indeed close to 20 mm.

In a particular embodiment, the thickness of the bellows passes in the preferred deformation zones from about 0.7 mm to about 0.3 mm.

Advantageously, the bellows has shape memory.

The bellows can be formed integrally with a dispenser endpiece.

The bellows can also be formed integrally with a portion of a receptacle or with a assembly skirt.

The invention also provides a dispenser head including a bellows as defined above.

The invention also provides a receptacle including a bellows as defined above.

The invention also provides a method of manufacturing at least one plastics material bellows, wherein a preform is made by molding thermoplastic material in a mold, said preform having preferred deformation zones, and then before the part has completely left the mold, the bellows is formed by folding the preform in the preferred deformation zones, and wherein a first region of the preform includes a coupling portion suitable for remaining engaged with a portion of the mold while the bellows is being formed.

The invention also provides a method of manufacturing at least one plastics material bellows, wherein a preform is made by molding thermoplastic material in a mold, said preform having preferred deformation zones, including at least one intermediate preferred deformation zone formed by means of a recess opening out to the inside surface of the preform and two other preferred deformation zones on either side thereof, after which the bellows is formed before the part has completely left the mold by folding the preform in the preferred deformation zones.

The invention also provides a method of manufacturing at least one plastics material bellows, wherein a preform is made by molding thermoplastic material in a mold, said preform having preferred deformation zones, and then prior to the part completing leaving the mold, the bellows is formed by folding the preform in the preferred deformation zones, and wherein the preform is molded integrally with a dispenser endpiece and/or a receptacle portion.

BRIEF DESCRIPTION OF THE DRAWINGS

Other characteristics and advantages of the present invention will appear on reading the following detailed description of non-limiting implementations of the invention, and on examining the accompanying drawings, in which.

MORE DETAILED DESCRIPTION

Figure 1:
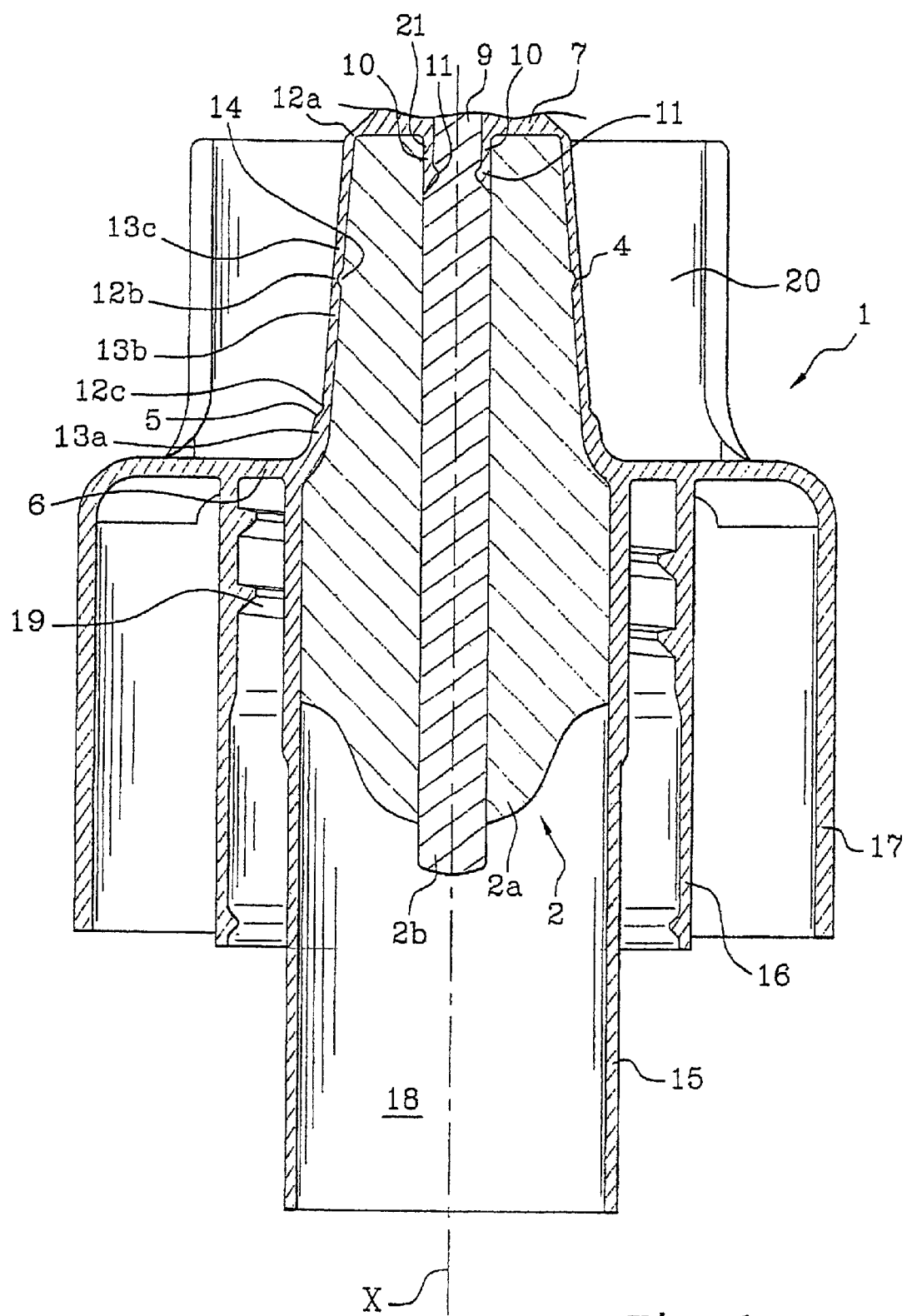
FIGS. 1 to 4 are diagrams showing four successive steps in the manufacture of a dispenser head in a first implementation of the invention.

FIG. 1 shows part of a preform 1 made by injection molding a thermoplastic material in a mold.

To clarify the drawing, the mold is represented only by a pin 2 thereof which is shown in part.

The pin 2 comprises both a hollow portion 2a and a core 2b that is movable inside the hollow portion 2a.

In the example described, the preform 1 is made of polypropylene, however it would not go beyond the ambit of the present invention to use other thermoplastic materials, whether elastomers or otherwise.

The preform 1 is for making a dispenser head suitable for dispensing a measured quantity of a liquid or semiliquid substance.

Figure 5:
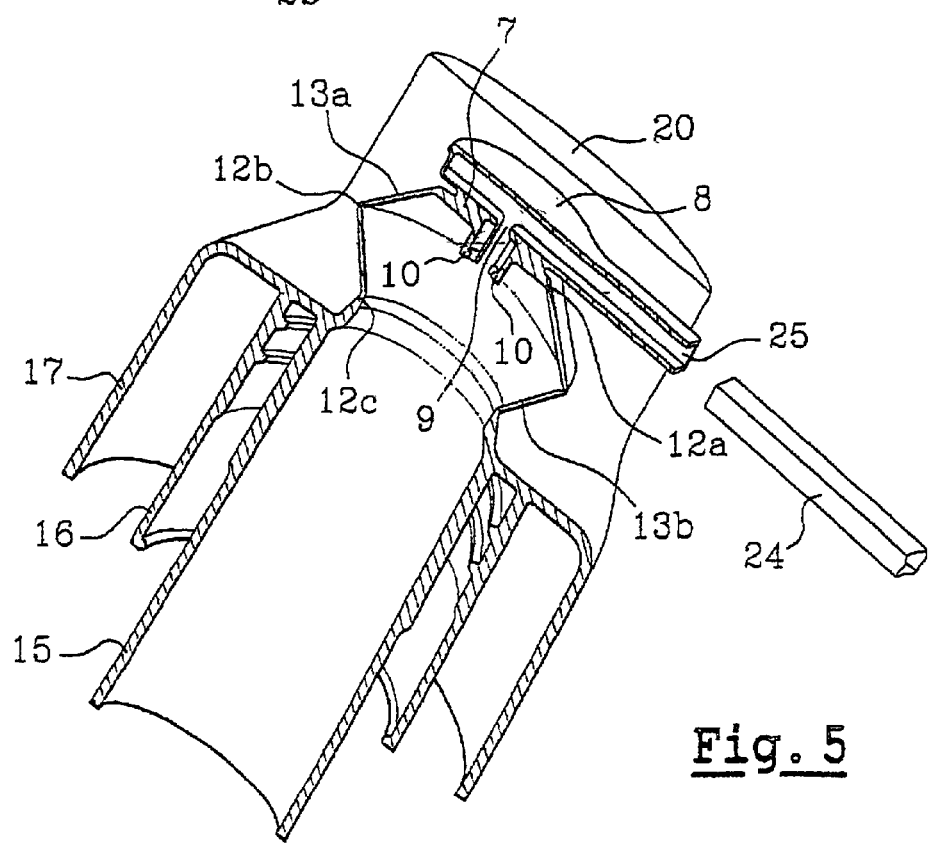
FIG. 5 is a diagrammatic axial section of the dispenser head obtained by the method of FIGS. 1 to 4.

The top portion of the preform 1 is constituted by a dispenser endpiece 8 which can be seen in FIG. 5 but which has been omitted from FIG. 1 in order to clarify the drawing.

In its bottom portion, the preform 1 has three concentric tubular skirts about an axis X, namely: an inner skirt 15, an intermediate skirt 16, and an outer skirt 17.

The outer and intermediate skirts 17 and 16 are of substantially the same length.

On its inside surface, the intermediate skirt 16 has a thread 19 enabling the dispenser head to be fixed on the neck of a receptacle.

The inner skirt 15 is substantially circularly cylindrical in shape about the axis X.

This inner skirt 15 extends downwards beyond the intermediate and outer skirts 16 and 17, and it is designed to engage in leakproof manner in the neck of the above-mentioned receptacle.

The inner and intermediate skirts 15 and 16 are connected together at the top by a transverse wall 6 extending perpendicularly to the axis X and connecting with the outer skirt 17 via a rounded portion.

Two side extensions 20 (only one of which can be seen in FIG. 5) have their bottom ends terminating on the transverse wall 6, and between them they leave a gap for the dispenser endpiece 8.

Between the two extensions 20, the preform 1 also has a deformable central portion 4 that is to make a bellows, as described in greater detail below.

The top end of this central portion 4 is connected to the bottom transverse wall 7 of the endpiece 8 and its bottom end is connected to the junction between the transverse wall 6 and the inner skirt 15 via a wall 13a of substantially the same thickness as the transverse wall 6.

The inner skirt 15 co-operates with the central portion 4 to define a cavity 18 which is occupied by the pin 2 during molding.

The shape of the outside surface of the hollow portion 2a defines the shape of the inner skirt 15 and the shape of the central portion 4 which are molded in contact therewith.

The central portion 4 is generally tapering in shape about the axis X.

The wall 13a is extended upwards by walls 13b and 13c.

The walls 13a and 13b are connected together by an area of reduced thickness 12c.

The walls 13b and 13c are connected together by an area of reduced thickness 12b.

The wall 13c is connected to the transverse wall 7 by an area of reduced thickness 12a.

The thickness of the wall 13b increases and then decreases on going up from the area 12c towards the area 12b.

The area 12c is made by means of a step 5 formed on the outside surface of the central portion 4.

The area 12b is made by a recess 14 formed in the inside surface of the central portion 4.

The area 12a is made by giving the peripheral edge of the transverse wall 7 a chamfered shape.

Each of the areas 12a, 12b, and 12c constitutes a preferred deformation zone in the meaning of the invention.

In the example described, the thickness of the central portion 4 is about 0.3 mm in its areas 12a, 12b, and 12c, and the maximum thickness of the walls 13b and 13c is about 0.7 mm.

The transverse wall 7 has a central opening 9 enabling the cavity 18 to communicate with the dispenser endpiece 8.

Three coupling tabs 10 distributed around the opening 9 extend downwards inside the cavity 18.

At its free end, each tab 10 has a catch 11 projecting radially inwards.

The moving core 2b is in the form of a circular cylinder about the axis X and, at its top end, it has recesses 21 for making the tabs 10 by co-operating with the hollow portion 2a.

The preform 1 is injection molded in the configuration shown in FIG. 1.

A slide 24 represented highly diagrammatically in FIG. 5 is used for molding the outlet channel 25 of the dispenser endpiece 8.

Once the preform 1 has been molded, the transverse wall 7 is coupled to the pin 2 since the tabs 10 are held captive in the recess 21.

The hollow portion 2a and the core 2b can be moved downwards in translation along the axis X.

The preform 1 is unmolded shortly after it has been molded so the preform 1 is still at a temperature which is high enough to enable it to be deformed easily.

Initially, both the hollow portion 2a and the core 2b are moved down together.

During this movement, the tabs 10 follow the pin 2.

Figure 2:
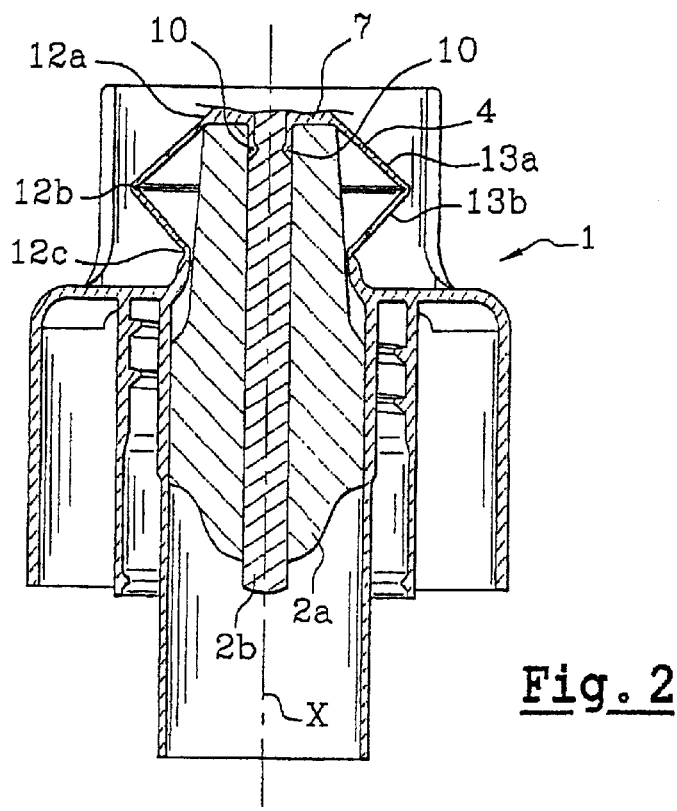

The transverse wall 7 is thus driven towards the inner skirt 15, causing the central portion 4 to fold in its areas 12a, 12b, and 12c, as shown in FIG. 2.

The presence of the hollow portion 2a inside the preform 1 constrains the walls 13b and 13a to fold outwards.

The bead on the hollow portion 2a corresponding to the recess 14 also tends to cause the walls 13a and 13b to fold outwards.

Figure 3:
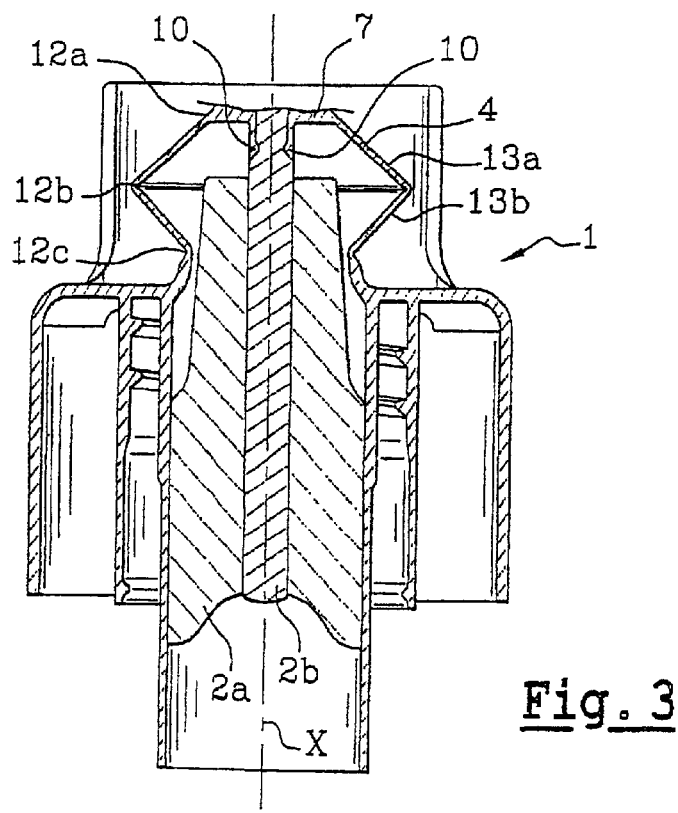

Once the bellows has been formed, the hollow portion 2a is lowered relative to the core 2b, thereby releasing the tabs 10, as shown in FIG. 3.

Figure 4:
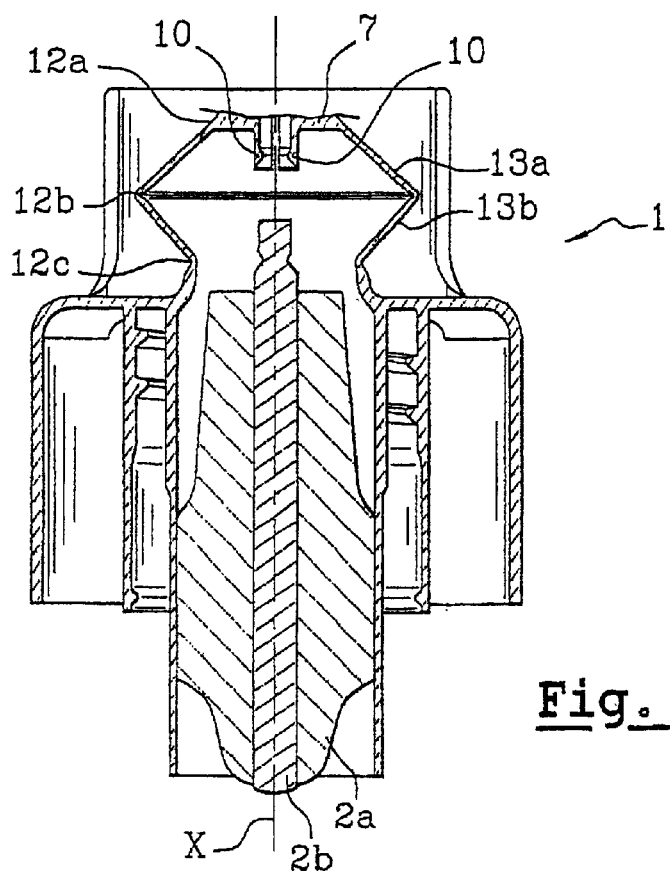

The tabs can then disengage from the core 2b by deforming elastically once the core has moved down further, so as to reach the configuration shown in FIG. 4.

It will be observed that the inner skirt 15 is unmolded very easily since it does not have any undercut portions.

The resulting bellows has shape memory and behaves, in use, like a spring.

FIG. 5 shows the dispenser head 1 after it has been unmolded.

It can be seen that the dispenser endpiece 8 is formed integrally with the remainder of the dispenser head 1.

This figure also shows that the side extensions 20 are of a height that is greater than the total height of the bellows plus the dispenser endpiece 8.

These side extensions 20 thus reduce the risk of pressure being applied accidentally to the dispenser endpiece 8.

Figure 6:
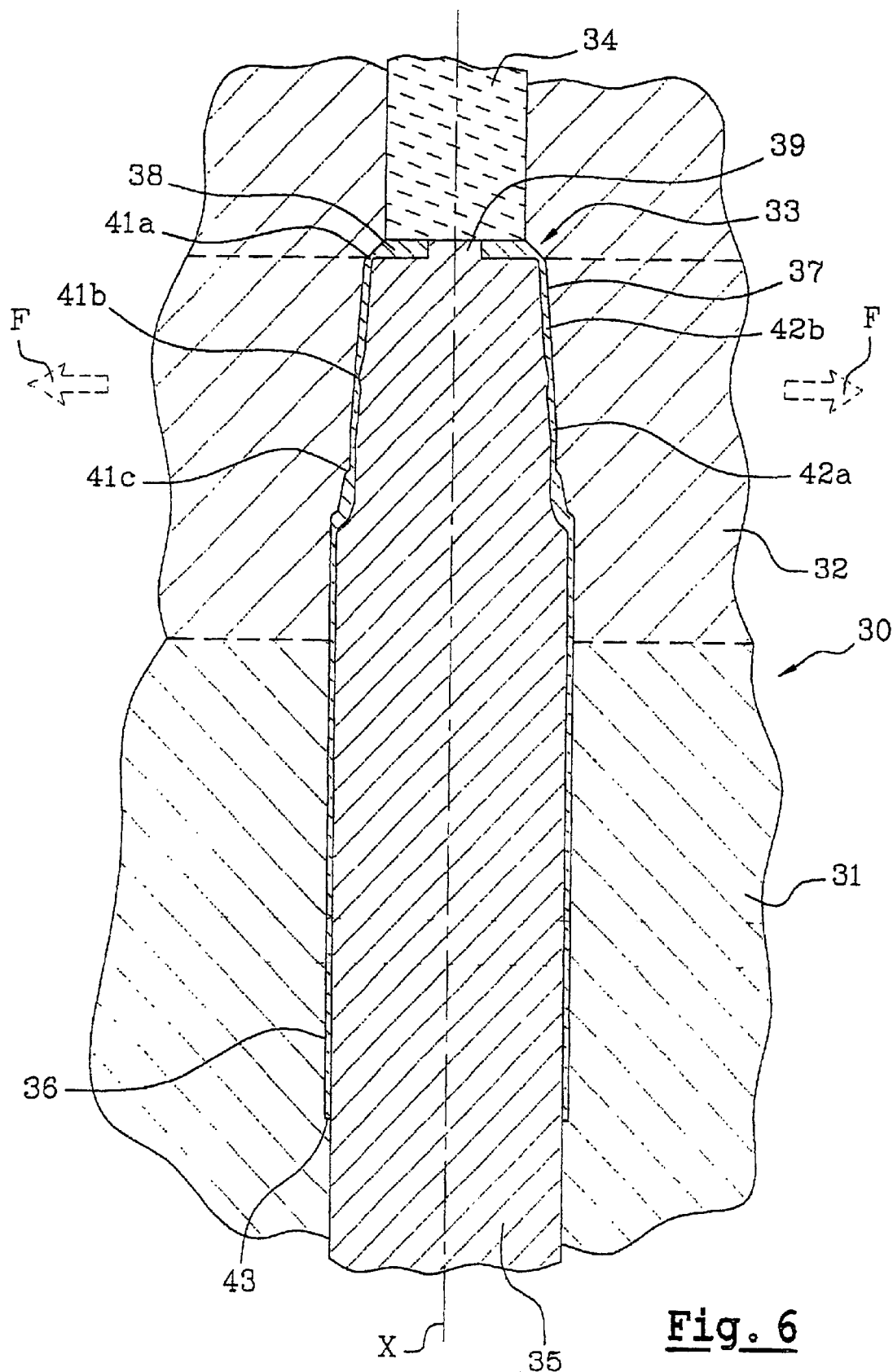
FIGS. 6 to 8 are diagrams showing three successive steps in the manufacture of a dispenser head in a second implementation of the invention.
Figure 8:
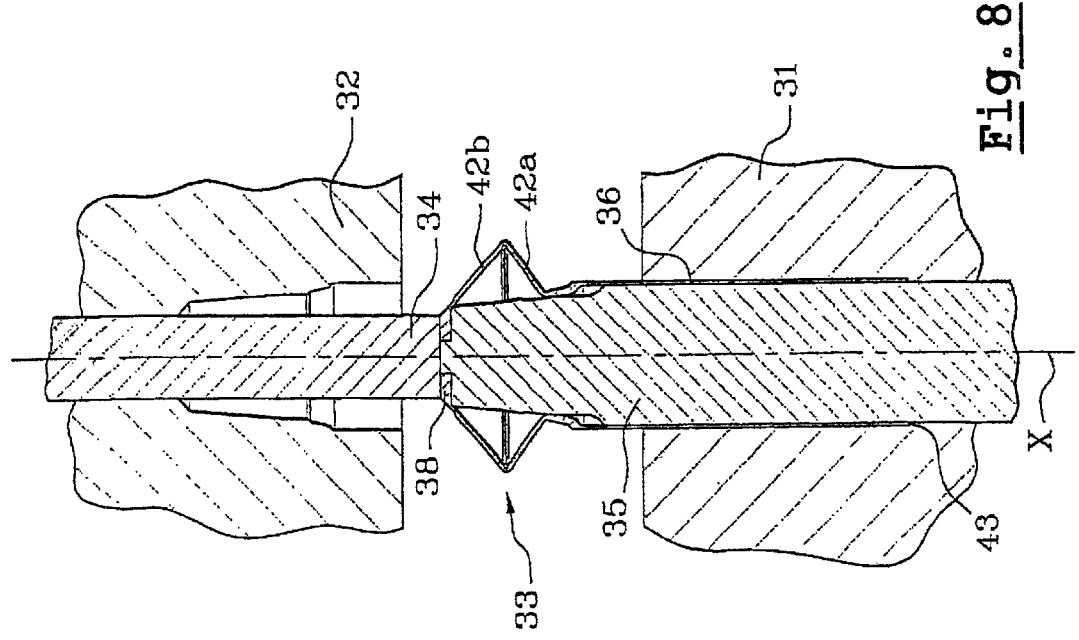
Figure 7:
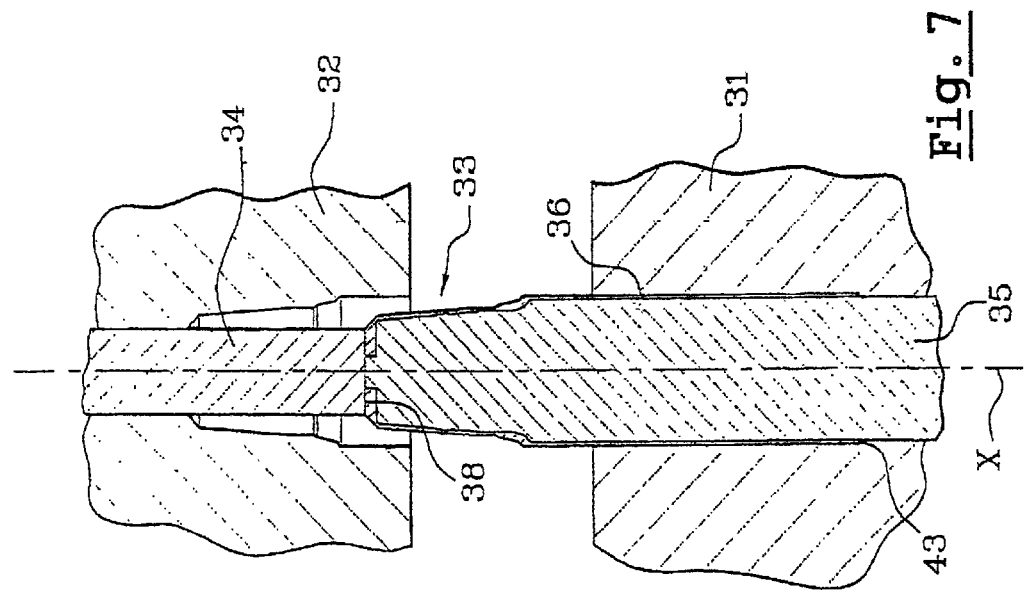

A second implementation of the invention is shown highly diagrammatically in FIGS. 6 to 8.

In this case a mold 30 is used comprising a bottom portion 31 and a top portion 32 co-operating with a bottom pin 35 and a top pin 34 to make a preform 33 by injection molding a thermoplastic material.

The bottom and top pins 35 and 34 are movable along the axis X relative to each other.

In its bottom portion, the preform 33 comprises a skirt 36 about the axis X and surmounted by a deformable frustoconical portion 37 that is to constitute a bellows.

The frustoconical portion 37 is analogous to the central portion 4 described above, and it differs therefrom solely by the fact that it is connected to a transverse wall 30 that does not have any coupling tabs.

The transverse wall 38 has a central opening 39 made during molding by means of the bottom pin 35.

Like the central portion 4 as described above, the frustoconical portion 37 has walls 42a and 42b that are interconnected by an area of reduced thickness 41b.

The wall 42a connects to the skirt 36 via an area of reduced thickness 41c.

The wall 42b connects to the transverse wall 38 via an area of reduced thickness 41a.

The areas 41a, 41b, and 41c are identical to the above-described areas 12a, 12b, and 12c and they constitute preferred deformation zones in the meaning of the present invention.

The bottom portion 31 has an annular shoulder 43 which acts during molding to define the bottom end of the skirt 36.

To unmold the preform 33, the top portion 32 is moved upwards as shown in FIG. 7, while the bottom portion 31 and both pins 34 and 35 remain stationary.

The top portion 32 rises through a distance which is sufficient to enable the frustoconical portion 37 to fold.

The method then passes from the step shown in FIG. 7 to the step shown in FIG. 8 by the pins 34 and 35 being moved together.

The shoulder 43 then serves as abutment for keeping the skirt 36 stationary.

The pins 34 and 35 move the transverse wall 38 towards the skirt 36, thereby causing the frustoconical portion 37 to fold in its reduced thickness areas 41a, 41b, and 41c.

After the bellows has been formed, the bottom pin 35 can be used to eject the part.

In a variant implementation of the invention, the top portion has slides below a limit represented by a dashed line, which slide can move away in the direction of arrows F so as to disengage any undercut.

Figure 10:
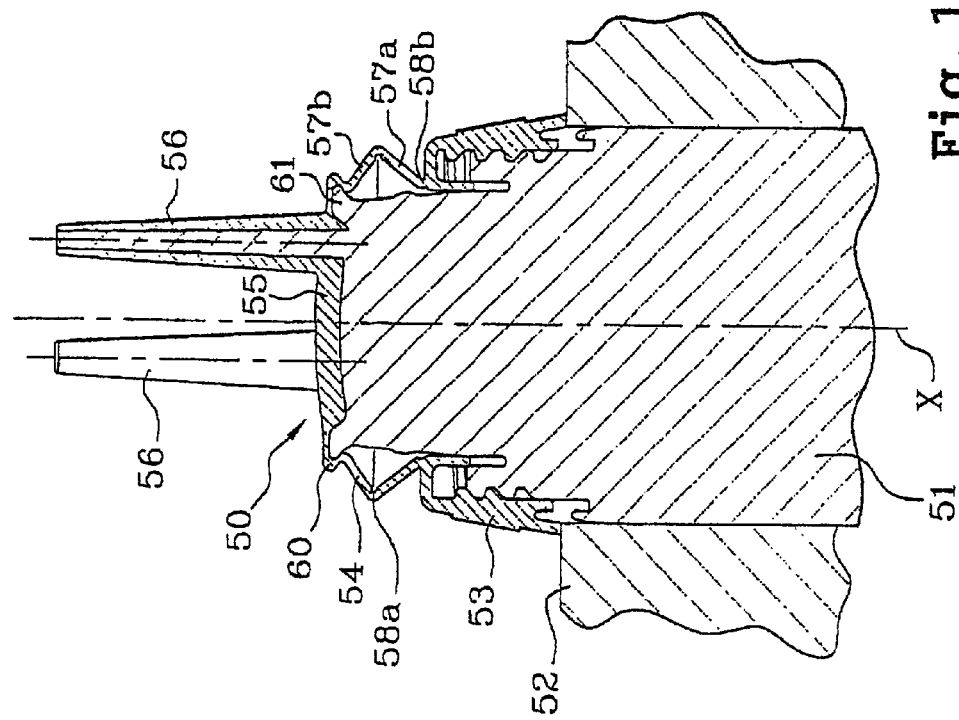
FIGS. 9 and 10 are diagrams showing two successive steps in the manufacture of a dispenser head in a third implementation of the invention.
Figure 9:
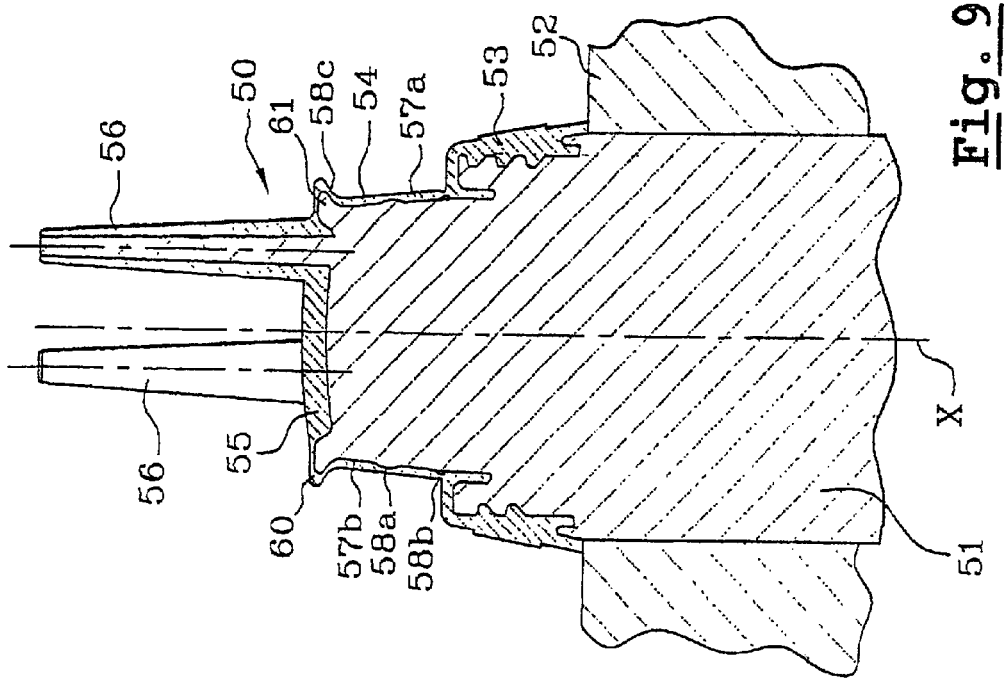

FIGS. 9 and 10 show two steps in a method constituting a third implementation of the invention.

FIG. 9 shows a preform 50 made by injection molding a thermoplastic material in a mold represented merely by a portion of a pin 51 and a bottom portion 52 surrounding the pin 51.

The top of the pin 51 is of a shape that matches the shape of the preform to be made.

The bottom portion 52 is suitable for moving in translation along the axis X relative to the pin 51.

In its bottom portion, the preform 50 has an assembly skirt with an inside thread 53.

This assembly skirt 53 is surmounted by a deformable portion 54 that is to form the bellows.

The deformable portion 54 is connected at its top end to a transverse wall 55 which supports three dispenser endpieces 56.

The assembly skirt 53 bears via its bottom end against the bottom portion 52 of the mold.

The deformable portion 54 includes a wall 57a and a wall 57b that are interconnected by an area of reduced thickness 58a.

This area 58a constitutes a first preferred deformation zone in the meaning of the invention.

The wall 57a is connected to the assembly skirt 53 via an area of reduced thickness 58b constituting a second preferred deformation zone.

The wall 57b is connected to the transverse wall 55 via an area of reduced thickness 58c, constituting a third preferred deformation zone.

The pin 51 has a portion in relief 61 in an undercut close to the area 58c.

The transverse wall 55 has an undercut peripheral portion 60 molded in contact with the portion in relief 61.

This peripheral portion 60 is of reduced thickness so as to enable it to go past the portion in relief 61 by deforming elastically.

In FIG. 9, the mold is shown after its elements outside the preform 50 and above the bottom portion 52 have been removed.

The method moves from the step shown in FIG. 9 to that shown in FIG. 10 by keeping the pin 51 stationary and moving the bottom portion 52 upwards.

With the assembly skirt 53 bearing against the bottom portion 52, it accompanies the bottom portion as it moves.

The transverse wall 55 of the preform 50 remains secured to the pin 51 at the beginning of the displacement of the bottom portion 52 because of the presence of the relief 61.

This causes the transverse wall 55 and the assembly skirt 53 to move relative to each other and the bellows to be formed by the deformable portion 54 folding in its three areas of reduced thickness 58a, 58b, and 58c.

The upward movement of the bottom portion 52 is continued until the preform 50 has been disengaged from the portion in relief 61, which is made easier by the elasticity of the peripheral portion 60.

In this implementation of the invention, the bellows is formed simultaneously with the molded part being ejected.

Figure 11:
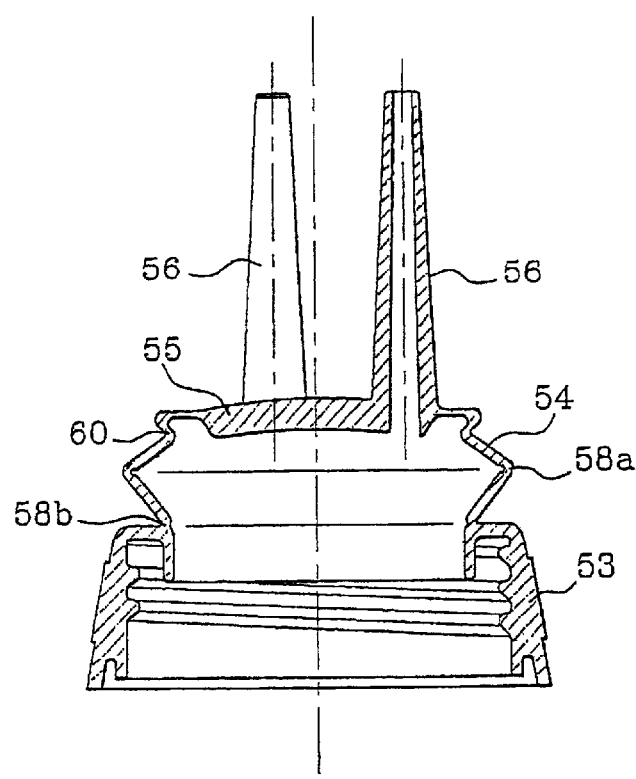
FIG. 11 is a diagram in axial section showing, in isolation, the dispenser head obtained by the method of FIGS. 9 and 10.
Figure 12:
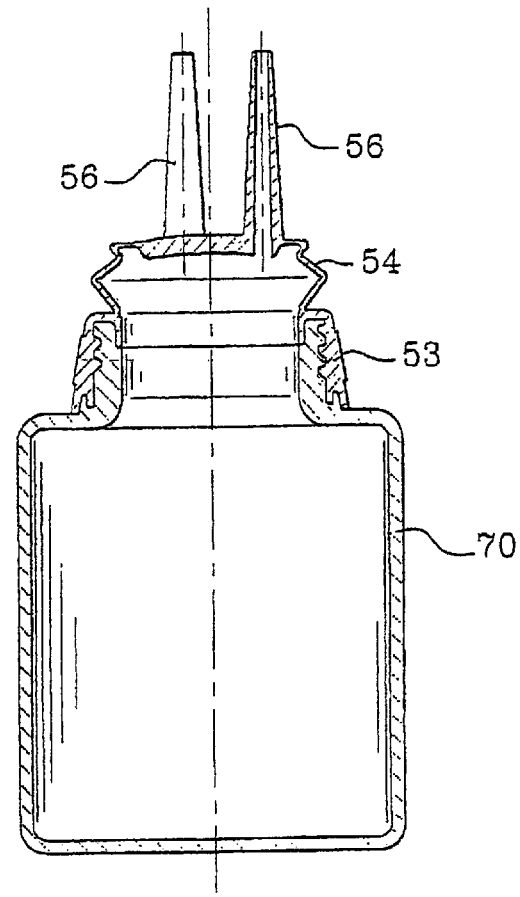
FIG. 12 is a diagrammatic axial section view showing the FIG. 11 dispenser heed fixed on a receptacle.

FIG. 11 shows the resulting dispenser head as obtained from the preform 50 in isolation, which head is designed to be screwed onto the neck of a receptacle 70, as shown in FIG. 12.

The device constituted by the receptacle 70 and said dispenser head can be used, for example, to dispense and apply a substance on the hair.

Naturally, the invention is not limited to the implementations described above.

In particular, it is possible to make multiple-wave bellows without going beyond the ambit of the present invention.

What is claimed is:

1. A method of manufacturing at least one bellows of plastic material, wherein a preform is made by molding thermoplastic material in a mold, the preform having preferred deformation zones, after which, prior to the part completely leaving the mold, the bellows is formed by folding the preform in its preferred deformation zones, the bellows obtained in this way being open at both ends.

2. A method according to claim 1, wherein the bellows is made from the preform before the preform has cooled down completely.

3. A method according to claim 1, wherein the preferred deformation zones are made in the form of areas of reduced thickness.

4. A method according to claim 1, wherein the preform is molded in contact with a pin, and wherein the pin is left inside the preform at least during the beginning of bellows formation.

5. A method according to claim 1, wherein the preform has formed therein at least three preferred deformation zones, including an intermediate preferred deformation zone formed by means of a recess opening out on the inside surface of the preform, and two other preferred deformation zones on either side thereof.

6. A method according to claim 1, wherein a dispenser endpiece and/or a receptacle portion is molded together with the preform.

7. A method according to claim 1, wherein the preform is made by injection molding a non-elastomer plastics material.

8. A method according to claim 7, wherein the preform is made of a polyolefin.

9. A method according to claim 7, wherein the preform is made of polyethylene or polypropylene.

10. A method according to claim 1, wherein the bellows is formed from the preform by moving a first region of the preform axially relative to a second region thereof, the preform having at least one preferred deformation zone between said regions.

11. A method according to claim 10, wherein all of the preferred deformation zones are situated between said regions.

12. A method according to claim 10, wherein the mold has at least one moving portion serving to cause the first region to move relative to the second.

13. A method according to claim 12, wherein the moving portion enables the bellows to be ejected from the mold.

14. A method according to claim 12, wherein the moving portion is situated outside the preform and is brought to bear thereagainst.

15. A method according to claim 12, wherein the first region of the preform is made with a coupling portion suitable for remaining engaged with a portion of the mold while the bellows is being formed.

16. A method according to claim 15, wherein the moving portion is constituted by a pin serving for molding the preform, with the coupling portion including an undercut.

17. A method according to claim 15, wherein the moving portion is constituted by a moving pin including a core capable of being moved relative to the remainder of the pin.

18. A method according to claim 17, wherein the core co-operates with the remainder of the pin to define a cavity for molding the coupling portion.

19. A method according to claim 18, wherein, after the preform has been molded together with its coupling portion, the core and the remainder of the pin are initially moved together in order to form the bellows, after which the core is moved relative to the remainder of the pin to enable the bellows to be separated from the pin.

20. A method according to claim 19, wherein the core is separated from the coupling portion by elastically deforming the coupling portion.

21. A method of manufacturing at least one plastics material bellows, wherein a preform is made by molding thermoplastic material in a mold, said preform having preferred deformation zones, and then before the preform has completely left the mold, the bellows is formed by folding the preform in the preferred deformation zones, and wherein a first region of the preform includes a coupling portion suitable for causing the first region to remain affixed to a portion of the mold while the bellows is being formed.

22. A method of manufacturing at least one plastics material bellows, wherein a preform is made by molding thermoplastic material in a mold, said preform having preferred deformation zones, including at least one intermediate preferred deformation zone formed by means of a recess opening out to the inside surface of the preform and two other preferred deformation zones on either side thereof, after which the bellows is formed before the part has completely left the mold by folding the preform in the preferred deformation zones.

23. A method of manufacturing at least one plastics material bellows, wherein a preform is made by molding thermoplastic material in a mold, said preform having preferred deformation zones, and then prior to the part completing leaving the mold, the bellows is formed by folding the preform in the preferred deformation zones, and wherein the preform is molded integrally with a dispenser endpiece and/or a receptacle portion.

* * * * *